United States Patent [19]

Wengrovius et al.

[11] Patent Number: 5,324,806
[45] Date of Patent: Jun. 28, 1994

[54] FREE FLOWING SILICONE RESIN POWDER AND METHOD FOR MAKING

[75] Inventors: Jeffrey H. Wengrovius, Scotia; Timothy B. Burnell, Schenectady; Michael A. Zumbrum, Clifton Park; Peter M. Miranda, Glenville; Merry S. Huber, Ballston Spa, all of N.Y.

[73] Assignee: General Electric Company, Schenectady, N.Y.

[21] Appl. No.: 30,737

[22] Filed: Mar. 12, 1993

[51] Int. Cl.$^5$ ............................................. C08G 77/34
[52] U.S. Cl. ...................................... 528/10; 528/12; 528/39; 528/502
[58] Field of Search ...................... 528/502, 10, 39, 12

[56] References Cited

U.S. PATENT DOCUMENTS 2,676,182  4/1954  Daudt et al. .
4,774,297  9/1988  Murakami et al. .
4,935,484  6/1990  Wolfgruber et al. .

Primary Examiner—Melvyn I. Marquis
Attorney, Agent, or Firm—William A. Teoli; William H. Pittman

[57] ABSTRACT

A free flowing silicone powder having a primary particle size in the range of 0.1–200 nm and an aggregate size of 10 nm to 200 microns which is a product formed by spray drying an organic solvent dispersion of an organosiloxane hydrolyzate having triorganosiloxy units and tetrasiloxy units.

7 Claims, No Drawings

FREE FLOWING SILICONE RESIN POWDER AND METHOD FOR MAKING

CROSS REFERENCE TO RELATED APPLICATION

Reference is made to copending applications Ser. No. 08/030,739, filed Mar. 12, 1993 and Ser. No. 08/030,740, filed Mar. 12, 1993 filed concurrently herewith.

BACKGROUND OF THE INVENTION

The present invention relates to free flowing silicone resin powder having a primary particle size in the range of about 0.1–200 nm and an aggregate size in the range of about 10 nm to 200 microns. More particularly, the present invention relates to the spray drying of an organic solvent dispersion of an organosiloxane hydrolyzate comprising chemically combined triorganosiloxy units and tetrasiloxy units to form a free-flowing silicone resin powder useful in making heat curable organopolysiloxane compositions.

A method for making silicone resin powder is shown by Wolfgruber et al, U.S. Pat. No. 4,935,484. Aqueous colloidal suspensions of resinous copolymer are spray dried to produce silicone resin powders having an average particle diameter of 10 to 150 nm. Although the spray dried powders of Wolfgruber et al can be utilized in a variety of applications as fillers, the powder still contains the emulsifying agent used in the preparation of the resinous copolymer as an impurity.

As taught by Wolfgruber et al, the silicone resin powder made by spray drying aqueous resinous copolymer can be used in plastics as a substitute for finely divided silica which has been rendered hydrophobic. However, it has been found that the aqueous spray dried powder made in accordance with the method of Wolfgruber et al having triorganosiloxy units chemically combined with tetrasiloxy units is incompatible with silicone fluids.

Attempts therefore to utilize the spray dried resinous copolymer powder made by the procedure of Wolfgruber et al to produce heat curable silicone compositions, such as pressure sensitive adhesives (PSA) shown by Murakami et al, U.S. Pat. No. 4,774,297 have been unsuccessful. It would be desirable therefore to provide a procedure for making finely divided silicone resin powder which is dispersible with silicone fluids and useful for making heat curable silicone compositions.

SUMMARY OF THE INVENTION

The present invention is based on the discovery that if an organic solvent dispersion of an organosiloxane hydrolyzate, referred to hereinafter as "MQ resin" having chemically combined triorganosiloxy units of formula, $$(R)_3SiO_{0.5}, \quad (1)$$

chemically combined with tetrasiloxy units of the formula, $$SiO_2, \quad (2)$$

where R is a $C_{(1-6)}$ monovalent organic radical, is spray dried, a free flowing silicone resin powder can be made which is dispersible in silicone fluids and useful for making heat curable silicone compositions, such as PSAs. The organosiloxane hydrolyzate is also referred to hereinafter as M'Q resin where M' is defined more particularly below.

Among the principal features of the invention, there are included the formation under interfacial conditions of MQ resin, or M'Q resin, and the separation of the organic phase from the hydrolysis mixture, followed by the spray drying of the resulting organic solvent dispersion. Advantageously, the resulting spray dried MQ or M'Q resin powder can be used directly by a fabricator in combination with silicone network ingredients to make heat curable silicone compositions, such as a PSA or a vibration damping composition. It would be desirable to make PSAs, as taught by Murakami et al cited above, without the inconvenience and environmental risks of organic solvent disposal.

STATEMENT OF THE INVENTION

There is provided by the present invention, a method for making free flowing silicone resin powder which can be blended with a silicone fluid to produce a substantially stable dispersion comprising, (1) forming an organosiloxane hydrolyzate comprising triorganosiloxy units and tetrasiloxy units under interfacial reaction conditions having an organo to Si ratio of about 0.5 to about 1.5, (2) separating the organosiloxane hydrolyzate from the mixture of (1) in the form of an organic solvent dispersion, and (3) spray drying the organic solvent dispersion of (2).

Radicals included by R in formula (1) are for example $C_{(1-6)}$ monovalent hydrocarbon radicals and $C_{(1-6)}$ monovalent hydrocarbon radicals substituted with monovalent radicals inert during condensation or addition reactions. There are included within R, monovalent organic radicals such as, $C_{(1-6)}$ alkyl radicals, for example, methyl, ethyl, propyl, butyl; aryl radicals, such as, phenol, and halogenated phenyl, for example chlorophenyl.

In addition to having M units included by formula (1), and Q units included by formula (2), the organosiloxane hydrolyzate also includes Q units of formula (2) chemically combined with M' units selected from the group consisting of mixtures of M units of formula (1), and units of the formulas, $$(R)_2R^1 SiO_{0.5}, \quad (3)$$

$$(R)_2 H SiO_{0.5}, \quad (4)$$

where R is as previously defined, and $R^1$ is a $C_{(2-4)}$ alkenyl radical and preferably vinyl. M' units also can include an average of up to 25 mole % of diorganodisiloxy units of the formula, $$R^2RSiO \quad (5)$$

and up to 25 mole % of monoorganotrisiloxy units of the formula, $$R SiO_{1.5}, \quad (6)$$

based on the total moles of siloxy units in the M'Q resin, where $R^2$ is a member selected from the group consisting of R, $R^1$ or H.

The organosiloxane hydrolyzate which is included within the present invention is toluene dispersible. At least 90% of all the R groups of the organosiloxane hydrolyzate resin are alkyl groups and preferably methyl. The organosiloxane hydrolyzate can contain from about 0.2% to about 5% and preferably from about 1% to about 3% by weight of hydroxy radicals based on the total weight of organosiloxane resin. A method for making organosiloxane hydrolyzate having triorganosiloxy units and tetrasiloxy units is shown by Daudt, U.S. Pat. No. 2,676,182, which is incorporated herein by reference. For example, a silica hydrosol can be reacted under acidic conditions with a source of triorganosiloxy units, such as shown by formula (1) for example a hexaorganodisiloxane, preferably, hexamethyldisiloxane, or a hydrolyzable triorganosilane, for example, trimethylchlorosilane, or mixtures thereof, followed by recovering a benzene dispersible resinous copolymer.

In the absence of spray drying in an inert organic solvent, such as xylene or toluene, the organosiloxane hydrolyzate can form an intractable solid. It is normally available as a 40 to 60% by weight of solids dispersion in an appropriate organic solvent. Suitable organic solvents are solvents conventionally used with organosiloxanes with boiling points below approximately 250° C. which include suitable aromatic hydrocarbons as well as aliphatic hydrocarbons, such as mineral spirits, hexane, heptane and cyclohexane.

For ease of handling, it has been discovered that by spray drying the organic solvent solution of the organosiloxane hydrolyzate resin directly, the resulting resin can be recovered as a finely divided particulate having a particle aggregate size in the range of from about 10 nanometers to 200 microns. Spray drying of the organic solvent solution of the organosiloxane hydrolyzate can be accomplished with a spray dryer having at least one vortex atomizer nozzle with a rotating atomizer in a dry-gas stream or having a two-fluid nozzle. Unlike the Wolfgruber et al method, the organosiloxane hydrolyzate of the present invention is spray dried from an organic solvent. Temperatures which can be employed in the dry-gas stream, such as nitrogen, can be from 90° C. to 300° C. and preferably from 100° C. to 250° C. The output temperature of the gas stream formed on drying is from 50° C. to 200° C.

The spray dried organic solvent dispersion can be used to make heat curable organopolysiloxane compositions, such as a PSAs.

In order that those skilled in the art will be better able to practice the present invention, the following examples are given by way of illustration and not by way of limitation. All parts are by weight.

EXAMPLE 1

91 parts of a sodium silicate solution (225 g, 27% $SiO_2$) were mixed thoroughly with 130 parts of water (321 g). This mixture was added with vigorous stirring to 81 parts of 16.5% of HCl in cooled water over a period of 7 min. Shortly after the completion of this addition (within 45 sec.), 87 parts of isopropanol (214.8 g) were added over a period of 5 min. After waiting for a period of 1 min., a mixture of 31.0 parts $Me_3SiCl$ (76.45 g) and 3.4 parts toluene (8.49 g) were next added over a period of 20 min. The reaction mixture was allowed to warm to room temperature and was then heated to reflux for 1.5 hr. 40.5 parts of toluene (100 g) were added with stirring. The reaction mixture was then transferred to an addition funnel in which organic and aqueous layers separated. The aqueous layer was removed, and the organic layer was washed with 300 g water. The water/isopropanol/toluene azeotrope was distilled from this solution yielding a solution of an MQ resin in toluene (35% by weight) having an M/Q ratio of about 0.6.

The MQ resin was then spray dried using a Yamato model GS31 organic solvent spray-dry apparatus. Spray-drying was achieved at a temperature of 100° C. employing nitrogen as the drying gas. The oxygen level was maintained below 5% for safe operation. The outlet temperature was 71° C. and the toluene was collected in a recovery system. There was obtained a finely divided powder having a volatiles content of less than or equal to 2%. The residual volatiles were then removed using a vacuum oven. Based on TEM (transmission electron microscopy), the powder had an average primary particle size of about 20 nm. Stable dispersion was obtained by hand mixing 60 grams of the finely divided solid in 40 grams of a vinyl chain terminated polydimethylsiloxane having a viscosity of 15 centipoise at 25° C. These results showed that the powder made by spray drying the MQ resin from an organic solvent dispersion would be suitable for making a heat curable silicone composition such as a PSA.

The above procedure was repeated except that a silicone resin powder was prepared in accordance with the procedure of Wolfgruber et al, U.S. Pat. No. 4,935,484, utilizing an aqueous mixture in combination with a surfactant. It was found that the resulting spray dried resin powder was not compatible with the vinyl terminated polydimethylsiloxane; it readily settled out to form a two-phase mixture. These results showed that the powder made by the Wolgruber et al method was unsuitable for making silicone PSA.

EXAMPLE 2

A series of silicone PSAs were prepared by blending the MQ resin powder of example 1 with a curable network silicone fluid mixture consisting of a vinylsiloxane having an average of 24.4 condensed dimethylsiloxy units and terminated with dimethylvinylsiloxy units, a silicon hydride siloxane having an average of 24.2 dimethylsiloxy units, 3.44 methylhydrogensiloxy units and terminated with trimethylsiloxy units, and a crosslinker having an average of 20.8 dimethylsiloxy units and terminal dimethylhydrogensiloxy units, 25 ppm of a platinum catalyst shown by Karstedt U.S. Pat. No. 3,814,730 and 0.75% by weight of dimethylmaleate as an inhibitor. In the PSA composition series, the MQ resin was employed at a range of from about 54% by weight to 62% by weight based on the total weight of the PSA compositions. The silicon hydride siloxane was employed with the vinyl siloxane at molar ratios of from about 1 to about 1.2. The PSAs were applied to a thickness of about 1 mil onto a Mylar ® polyester film having a thickness of about 1.5 to 2 mils. PSAs were then cured at 130° C. for 8 minutes and tested for a peel adhesion (ounce/inch) using an Instron tester. The PSAs were also measured for tack employing a probe tack tester.

Tack values were found to exceed 700 grams/centimeter$^2$ for all PSAs having greater than 56% by weight of MQ powder in the PSA composition.

Although the above examples are directed to only a few of the very many variables which can be employed in the practice of the present invention, it should be understood that the present invention is directed to a much broader variety of MQ resin powders and method for making as set forth in the description preceding these examples.

What is claimed is:

1. A method for making free flowing silicone resin powder which can be blended with a silicone fluid to produce a substantially stable dispersion comprising,
   (1) forming an organosiloxane hydrolyzate in an aqueous-organic solvent medium under interfacial reaction conditions, where the organosiloxane hydrolyzate comprises triorganosiloxy units and $SiO_2$ units and has an organo to Si ratio of about 0.5 to about 1.5,
   (2) separating the organosiloxane hydrolyzate from the mixture of (1) in the form of an organic solvent dispersion, and
   (3) spray drying the organic solvent dispersion of (2).

2. A spray dried powder made in accordance with the method of claim 1.

3. A method in accordance with claim 1, wherein the organosiloxane hydrolyzate comprises chemically combined in $(R)_3SiO_{0.5}$ units and $SiO_2$ units, where R is a $C_{(1-6)}$ monovalent organic radical.

4. A method in accordance with claim 3, where R is methyl.

5. A method in accordance with claim 1, where the organic solvent dispersion is a toluene dispersion.

6. A method in accordance with claim 1, where the organosiloxane hydrolyzate comprises a mixture of chemically combined $SiO_2$ units, $(R)_3SiO_{0.5}$ units and units selected from the group consisting of $(R)_2R^1SiO_{0.5}$, $(R)_2HSiO_{0.5}$, $R^2SiO$ and $RSiO_{1.5}$, where R is a $C_{(1-6)}$ monovalent organic radical, $R^1$ is a $C_{(2-4)}$ alkenyl radical, $R^2$ is a radical selected from the group consisting of R, $R^1$ and H and based on the total moles of siloxy units in the organsiloxane hydrolyzate the moles of $R^2SiO$ units, or $RSiO_{1.5}$ units, does not exceed 25 mole percent.

7. A spray dried powder made in accordance with the method of claim 6.

* * * * *